United States Patent [19]

Matsunaga et al.

[11] Patent Number: 4,705,348
[45] Date of Patent: Nov. 10, 1987

[54] OPTICAL SWITCH

[75] Inventors: Hiroshi Matsunaga; Ichiro Tokunaga; Yoji Shimojima, all of Furukawa; Kosei Obata, Miyagi, all of Japan

[73] Assignee: Alps Electric Co., Ltd., Japan

[21] Appl. No.: 587,390

[22] Filed: Mar. 8, 1984

[30] Foreign Application Priority Data

Mar. 9, 1983 [JP] Japan .................................. 58-37320

[51] Int. Cl.⁴ .............................................. G02B 6/32
[52] U.S. Cl. .............................. 350/96.15; 350/96.18; 350/96.20
[58] Field of Search ............... 350/96.15, 96.20, 96.29, 350/96.30, 96.18

[56] References Cited

U.S. PATENT DOCUMENTS

| | | | |
|---|---|---|---|
| 4,400,055 | 8/1983 | Ozeki et al. | 350/96.15 |
| 4,431,261 | 2/1984 | Kozikowski | 350/96.20 |
| 4,432,599 | 2/1984 | McMahon | 350/96.15 |
| 4,433,898 | 2/1984 | Nasiri | 350/96.20 |
| 4,498,730 | 2/1985 | Tanaka et al. | 350/96.18 |

Primary Examiner—William L. Sikes
Assistant Examiner—Frank González
Attorney, Agent, or Firm—Guy W. Shoup

[57] ABSTRACT

An optical switch comprising an optical fiber member having its light sending end surface and light receiving surface bound closely in contact along a flat side of their ends, and a reflecting surface which is provided at the end surface of a swinging lever for switching ON and OFF the light reflecting condition where the light sent from the sending end surface is guided or not guided to the receiving end surface.

2 Claims, 7 Drawing Figures

OPTICAL SWITCH

FIELD OF THE INVENTION

This invention relates to a photo switch for optical fiber to be used in light communication or control of machinery.

BACKGROUND OF THE INVENTION

Recently, an optical fiber having the characteristic of being light weight and not influenced by noise during transmission has been used as a transmission line for light communication and controlling machinery, and an optical switch to be used with the optical fiber has been structured as indicated by FIG. 1 and FIG. 2.

Such an optical switch has the structure that the polished end surfaces 1a, 2a of optical fibers 1, 2 are arranged face to face across gap C and a metallic shielding plate 3 is inserted or removed into/from gap C. In this case, the switch is turned ON by allowing the light beam to pass through the gap C, namely transmitted while the shielding plate is removed as indicated in FIG. 1 or turned OFF by shielding the light beam with the shielding plate 3 inserted into the gap C as indicated in FIG. 2.

However, if the end surfaces 1a and 2a are not arranged face to face accurately, such photo switch results in a large loss of light beam, during ON condition, because the light beam sent from the optical fiber 1 is not effectively transmitted to the optical fiber 2. Thereby, production efficiency has been lowered because it is necessary to accurately match the axes of the optical fibers 1 and 2.

SUMMARY OF THE INVENTION

This invention has been proposed in view of eliminating such problems and has an object of providing an optical switch which has improved production efficiency by eliminating the severe requirement for precisely aligning the axes of optical fibers.

In order to attain such object, this invention proposes an optical switch having an optical fiber member formed by a light sending optical fiber having the light sending end surface and a light receiving optical fiber having the light receiving end surface which are closely arranged side-by-side and a reflecting surface which turns the light beam ON and OFF by selecting a position for the reflecting condition where the light sent from the sending end surface is guided to the receiving end surface and a non-reflecting condition where such light is not guided to the receiving end surface.

BRIEF DESCRIPTION OF THE DRAWINGS

FIG. 1 indicates the front view of said optical switch in the ON condition while FIG. 2 the front view of said optical switch in the OFF condition.

FIG. 3 is the front view of the described optical switch shown in section in order to explain the internal structure.

FIG. 5 shows the ON-OFF characteristic of the optical fiber member of FIG. 4.

FIG. 6 shows the end surface of an optical fiber member where the side end of light sending end and the light receiving end are placed in closed contact condition while the end surfaces are formed with a circular cross-section.

FIG. 7 shows the ON-OFF characteristic of the optical fiber member of FIG. 6.

DETAILED DESCRIPTION OF THE INVENTION

This invention will then be explained in detail with reference to the drawings.

Figure 1:
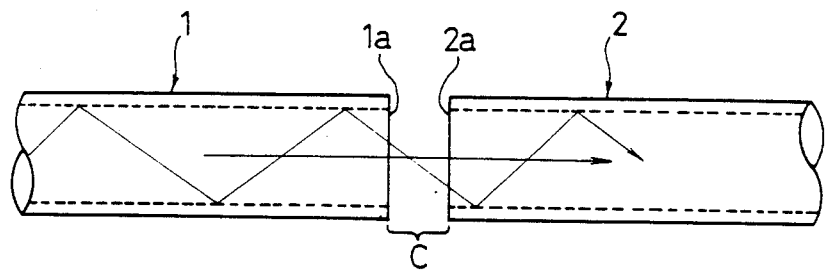
FIG. 1 and FIG. 2 show conventional optical switches.
Figure 2:
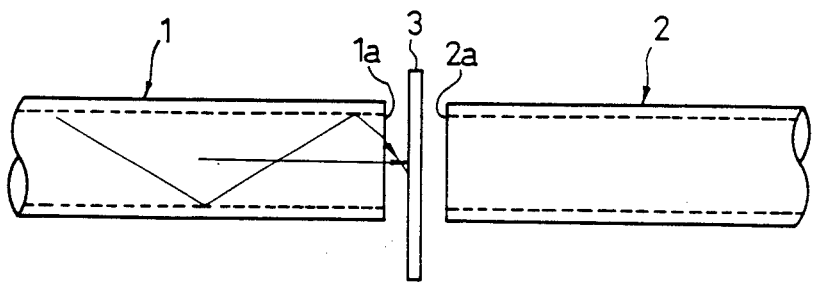
Figure 3:
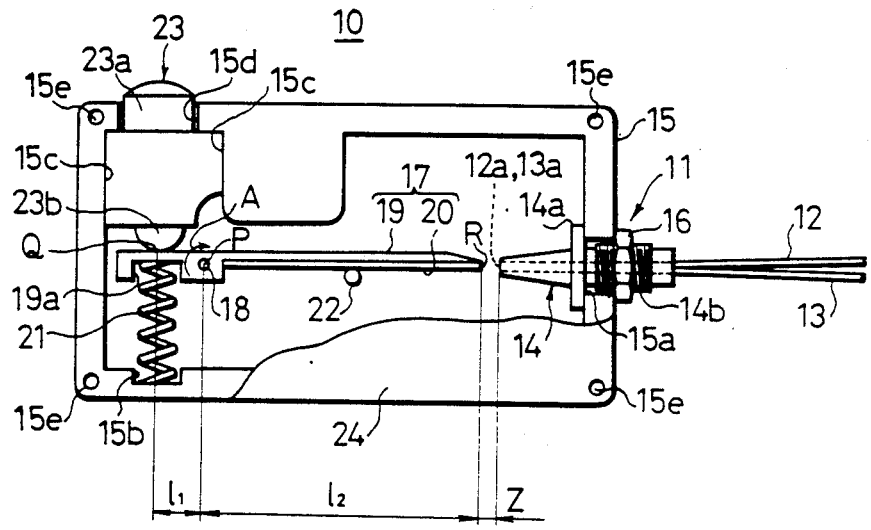
FIG. 3 and FIG. 5 respectively show an embodiment of an optical switch of this invention.
Figure 5:
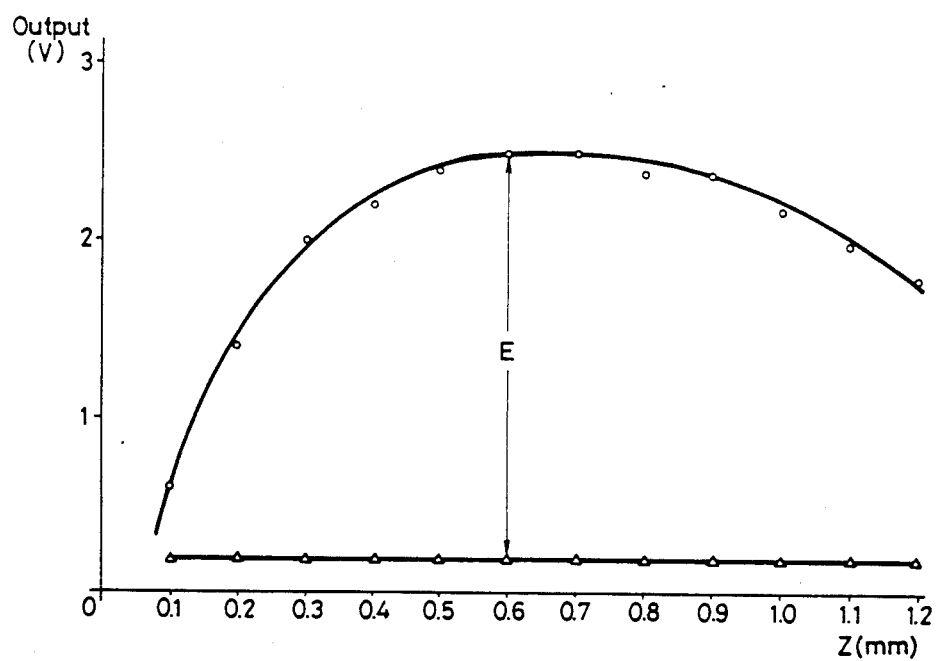

FIG. 3 and FIG. 5 respectively show an embodiment of an optical switch of this invention.

Figure 4:
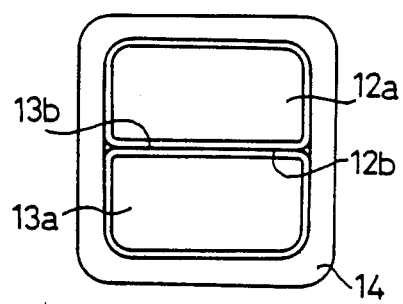
FIG. 4 is front end surface of an optical fiber member of the invention having a light sending end and a light receiving end arranged with a flat side and closely placed in contact at the flat side.

In these figures, numeral 10 indicates a photo switch. Similarly, 11 is a photo sensor which is composed of a light sending end surface 12a and a light receiving end surface 13a arranged side-by-side and is mounted to a metal fitting 14. Here, both the sending optical fiber 12 and receiving optical fiber 13 are made of resin, both the sending end surface 12a and receiving end surface 13a are formed flat by the thermal molding method and both ends are placed closely in contact at the flat side surfaces 12b and 13b. (Refer to FIG. 4.) The fitting metal 14 is inserted into a groove 15a provided at a resin frame 15 and is mounted to the frame 15 by a tightening force provided by a guard 14a and a nut 16 engaged with thread 14b of the metal fitting 14. Numeral 17 is a lever consisting of a resin swinging member 19 which is swingingly mounted to a metal fulcrum pin 18 implanted to the frame 15 and a metal plate 20 which is attached to the lower surface to such swinging member 19 and forms the reflecting surface R at its one end. The swinging surface of lever 17 is perpendicular to the flat side surfaces 12b and 13b of the light sending end surface 12a and the light receiving end surface 13a. This lever 17 is composed of a spring support 19a provided on member 19 supporting one end of spring 21, the other end of which is engaged with a spring support 15b in the frame 15. The member 19 is biased the direction A by the spring 21 and abuts against a stop pin 22 integrated to the frame 15. Numeral 23 indicates a resin push button which is guided by the wall part 15c of frame 15 and moves forward or backward. Its head part 23a is engaged with groove 15d provided on the frame 15 and is extended toward outside and its inside projected part 23b at the lower end abuts against the lever 17. The lever 17 swings with the center of fulcrum pin 18 determined as the fulcrum P and with the point where the part 23b abuts against the lever 17 determined as the operation input point Q, and the distance $l_1$ from the swinging fulcrum P of the lever to the operation input point Q is set considerably shorter than the distance $l_2$ from the swinging fulcrum P of the lever to the reflecting surface R. 24 is a metal cover which is mounted to the frame 15 by pins inserted through, holes matching holes 15e in the frame 15.

When the push button 23 is not pushed, the lever 17 is energized by the spring 21 and abuts against the stop pin 22, while the reflecting surface R is just provided opposite the light sending end surface 12a and light receiving end surface 13a and reflects the light sent from the sending end surface 12a to the receiving end surface 13a light. Therefore, the light sent from the light sending optical fiber 12 is transmitted to the light receiving optical fiber 13, resulting in the switch-ON condition.

When the push button 23 is pushed, the lever 17 rotates in the reverse direction to the direction A and therefore the reflecting surface R moves to the position wherein it does not face the light sending end surface 12a and light receiving end surface 13a, thereby not reflecting the light sent from the light sending end surface 12a to the light receiving end surface 13a. Therefor, the light sent from the light sending optical fiber 12 is not transmitted to the light receiving optical fiber 13, resulting in the switch-OFF condition. When the amount of depression of the push button is considered as $u_1$ and movement of reflecting surface R is considered as $u_2$, following relation can be obtained.

$$u_2 = (l_2/l_1) \times u_1$$

Accordingly, the reflecting surface R moves more than the amount of depression of push button 23 by setting the distance $u_1$ smaller than the distance $u_2$ and thereby the switch-OFF condition can be obtained reliably only by soft-touch operation to the push button 23.

FIG. 5 shows the ON-OFF characteristic of this embodiment. In this figure, the distance Z between the reflecting surface R and the light sending and receiving end surfaces 12a, 13a when the push button 23 is not pushed is plotted on the horizontal axis, while an output obtained by converting the light received by the light receiving optical fiber 13 into an electrical signal by a photo-electric converter is plotted on the vertical axis. The circles indicate output values under the switch-ON condition, while triangles output values under the switch-OFF condition.

Figure 6:
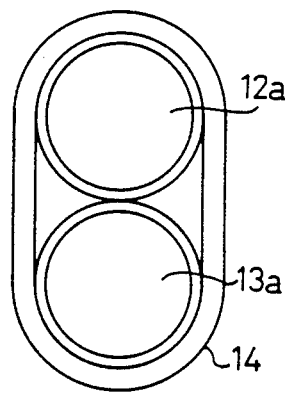
FIG. 6 and FIG. 7 show relations between close contact conditions of the light sending end surface and the light receiving end surface and their ON-OFF characteristic, in comparison with those in FIG. 4 and FIG. 5.
Figure 7:
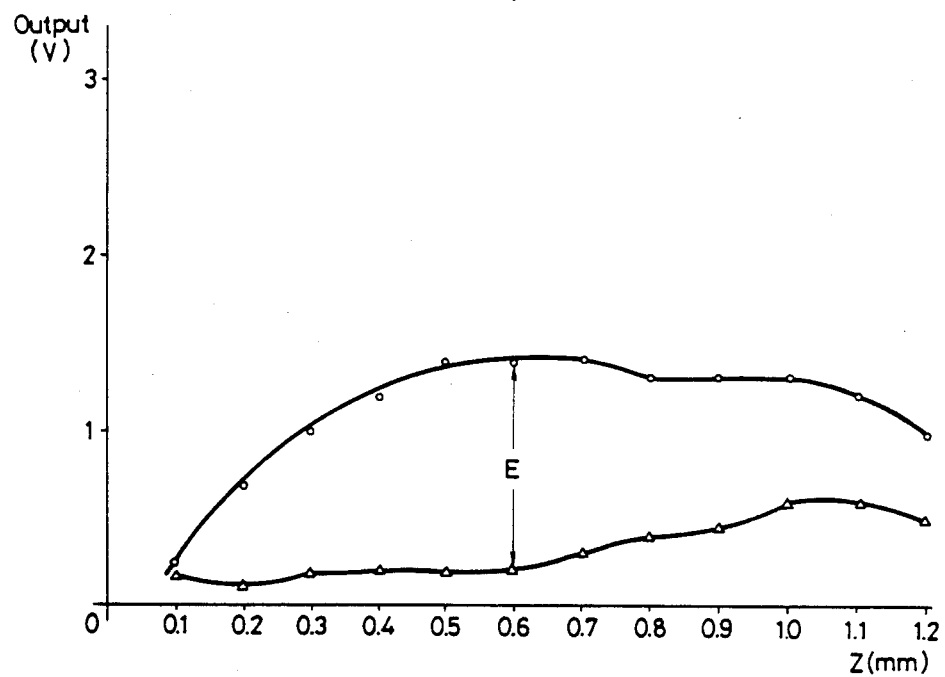

By comparison, when the sending end surface 12a and receiving end surface 13a are circular as shown in FIG. 6 and are not flat, the ON-OFF characteristic shown in FIG. 7 can be obtained.

As will be understood from comparison between FIG. 5 and FIG. 7, difference E between an output value under the switch-ON condition and an output value under the switch-OFF condition in FIG. 5 is larger than that in FIG. 7 for the same facing distance Z. Moreover, in the case of FIG. 5, the difference between output values is larger for the facing distance Z of wider range.

Thus, an optical fiber member wherein the fiber end surfaces have sides which are flat and closely in contact at the flat side surface is more apparently capable of providing a larger difference in the ON and OFF conditions to the receiving optical fiber 13 and a larger range of allowed fluctuation of facing distance Z.

Above characteristic can also be obtained when the sending optical fiber and receiving optical fiber are made of glass.

In this embodiment, the reflecting surface is provided at the end surface of the swinging lever and moves with the swinging of the lever. But it is not limited only to the lever which has this construction. For example, it is enough for the lever to make the operation resulting in the reflecting condition or not-reflecting condition where the light sent from the light sending end surface of the optical fiber is guided or not guided to the receiving end surface of the receiving optical fiber.

Here, non-reflecting condition may be the condition where the reflecting surface is deviated from the light path and does not reflect the light sent from the sending end surface or the light sent from the sending end surface is reflected and is guided in a direction other than the direction to the light receiving end surface.

Moreover, in this embodiment, the distance from the swinging fulcrum of lever to the operation input point is shorter than the distance from the swinging fulcrum of lever to the reflecting surface in view of enhancing ON-OFF changeover sensibility. But where the distance from the swinging fulcrum of the lever to the operation input point is set longer, on the contrary, than the distance from the swinging fulcrum of the lever to the reflecting surface, it results in lowering the ON-OFF changeover sensitivity and thereby reducing the possibility mis-operation.

This invention therefore has eliminated the severe matching process of axes of optical fibers and results in the effect that production efficiency can be improved as much.

What is claimed is:

1. An optical switch comprising:
   an optical fiber member having a light sending fiber and a light receiving fiber whose ends are arranged close together;
   a reflecting surface movable to a position adjacent said ends of said fiber for reflecting light from the light sending fiber end to the light receiving fiber end in an ON state of the switch and to a position wherein it does not reflect light from the light sending fiber end to the light receiving fiber end in an OFF state of the switch; and
   a lever, which is pivotable about a fulcrum at an intermediate position thereof, having an elongated length and said reflecting surface provided at one end thereof on an edge perpendicular to its elongated length arranged in opposing relation to said optical fiber member, and switch actuating means at the other end thereof for pivoting said other end of said lever such that said reflecting surface on said one end is moved between said ON and OFF states, wherein the distance from said actuating means to said fulcrum is shorter than the distance from said fulcrum to said reflecting surface.

2. An optical switch according to claim 1, wherein said ends of said optical fibers have a flat side and are closely arranged together along said flat side to increase the difference in output values between said ON and OFF states.

* * * * *